E. SACHS & M. MOSSIG.
BACK PEDALING BRAKE AND FREE WHEEL MECHANISM.
APPLICATION FILED APR. 13, 1911.

1,015,744.

Patented Jan. 23, 1912.

Witnesses

Inventors

UNITED STATES PATENT OFFICE.

ERNST SACHS, OF SCHWEINFURT, AND MAX MOSSIG, OF BERLIN, GERMANY.

BACK-PEDALING BRAKE AND FREE-WHEEL MECHANISM.

1,015,744.  Specification of Letters Patent.  Patented Jan. 23, 1912.

Application filed April 13, 1911. Serial No. 620,770.

*To all whom it may concern:*

Be it known that we, ERNST SACHS and MAX MOSSIG, residing, respectively, at No. 23 Schultesstrasse, Schweinfurt, Germany, and No. 26 Arndtstrasse, Berlin, Germany, have invented a new and useful Improvement in Back-Pedaling Brake and Free-Wheel Mechanism, of which the following is a specification.

This mechanism is constructed of two separate devices, one of which comprises the driving and free-wheel clutch means, while the other is the brake operated by back-pedaling through the mediation of the driving appliance, the two mechanisms being adapted to be screwed, one after the other, on the periphery of a rear-wheel hub in lieu of the usual sprocket rim and its counter nut, the respective right and left hand threads being used for this purpose likewise.

The object of the invention is a special construction of the brake device which produces a high braking effect, because it is operating in opposite directions, whereby the pressure upon the hub is balanced, while the braking surface is of a greater area than has heretofore been attained.

A further object of the invention is to so connect the braking members to an intermediate ring transmitting the power from the driving means to the brake, that the said ring is released from any radial pressure, which is advantageous for the reason that the said ring is also used for the purpose of controlling the driving clutch.

This object is obtained by means of brake-blocks encircling a ring member of the hub, and provided with inclined pockets in their outer faces to receive rollers adapted to expand a stationary split brake-ring and to press the same against a second member rotating with the hub; the two members of cylindric shape which receive the pressure of the brake mechanism, which pressure is directed radially inward and outward respectively, are rigidly connected with one another, so that no undue pressure is transmitted to movable parts. The engagement of the intermediate power-transmitting ring with the brake is obtained through lugs projecting from the said ring and embracing the brake blocks, but permitting a slight radial movement of the same.

Figure 1:
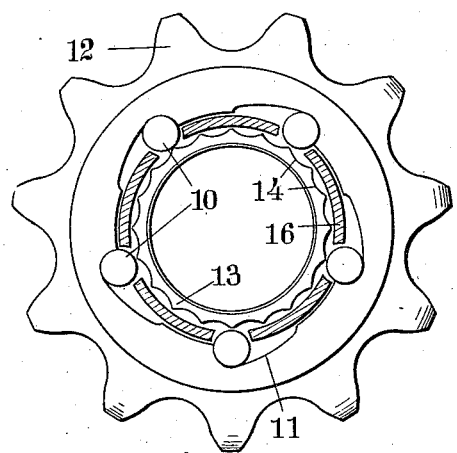
Figure 2:
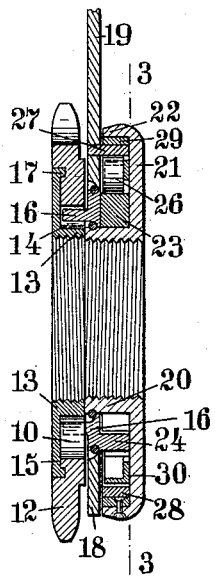
Figure 4:
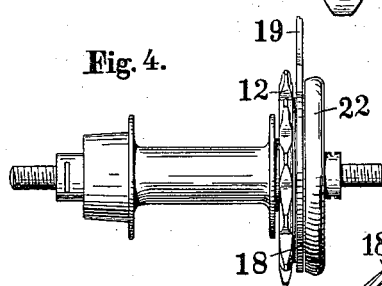
Figure 3:
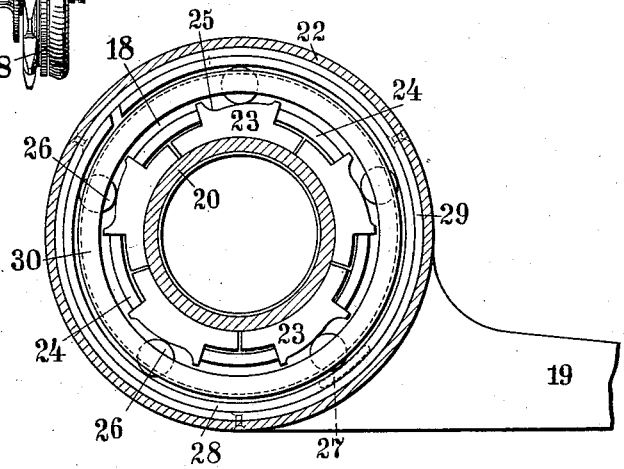

A constructional form of the free wheel and brake mechanism embodying the invention is illustrated by way of example in the annexed drawing forming a part of this specification, and in which:

Figure 1 is a vertical side elevation of the inner face of the driving mechanism, the spacer-ring of the clutch members being shown in cross-section; Fig. 2 is a vertical sectional elevation of the entire mechanism, the section being taken along the axis; Fig. 3 is a vertical sectional elevation on the line 3—3 of Fig. 2, representing the details of the brake. Fig. 4 is a side view of a rear-wheel hub of a cycle on the periphery of which the complete mechanism is fixed.

Like numerals designate like parts throughout all figures of the drawing.

The driving mechanism including the sprocket rim 12 is screwed on the hub by means of internal right hand threads corresponding to the threads as used on such hubs, and the brake is screwed on the end of the hub by means of the left hand threads there provided, as illustrated in Fig. 4, while the free extremity of the stationary brake arm 19 may be attached to one tube of the rear fork of the cycle in any known manner.

As will be clearly seen from Fig. 1, the free-wheel clutch comprises a number of clamping rollers 10 in slanting pockets 11 in the inner periphery of the sprocket rim 12, this construction being a clutch device of well known type. When the toothed rim rotates forwardly the rollers 10 will act on the periphery of a ring 13, screwed by means of the right-handed thread provided on the hub, in place of the sprocket wheel which is ordinarily secured directly and rigidly to the hub and are pressed against the smoth periphery of this ring, or rest in recesses 14 provided therein, as shown in the example represented. On the side of the ring directed toward the spoke flange of the hub is a flange 15 which guides the toothed rim 12 and the rollers 10, and is provided at its edge with an annular bead 17 which engages an annular groove in the side of the toothed rim and thereby supports and guides the latter. The rollers 10 of the driving clutch mechanism are controlled by a guide or spacer ring 16 located between the toothed rim 12 and the ring 13, and are held at definite distances apart in the openings in this ring.

The brake is arranged on an internally left-handed screw-threaded ring 20 integral with a disk 21 having a flange 22 directed toward the toothed rim 12 (Fig. 2). Between this toothed rim and the brake is placed a disk 18 which can be connected non-revolubly with the fork of the rear wheel by means of the arm 19, as well known in the art. These parts also form a case in which the brake is inclosed and protected from injury and dust. The brake itself comprises a number of brake blocks 23 which are located around the ring 20, and held loosely in the recesses formed between the lugs 24 projecting axially from the guide ring 16, and are provided in their outer peripheries with slanting pockets 25, in which clamping rollers 26 are held. The pockets are of such a shape that when the guide ring 16 and the blocks 23 rotate backward, the rollers 26, held at definite distances apart and uniformly controlled by a retainer ring 30 are moved radially, so that they act on the inner face of a split brake-ring 28 attached non-revolubly by means of a lug or pin 27 to the disk 18, expand this ring and press it against the inner side of the flange 22 or against a liner 29 of brass or other suitable braking material rigidly attached to this flange by means of rivets or the like, as shown in Figs. 2 and 3. Owing to the reaction of the rollers 26 on the blocks 23, the latter are simultaneously pressed against the periphery of the ring 20, so that they likewise produce a braking action at their inner curved faces. Instead of acting directly on the ring 20, the blocks 23 may compress an interposed split brake-ring around the ring 20, which brake ring may be attached to the disk 18 in a manner similar to that in which the ring 28 is attached to the same. The arrangement may also be the reverse, when the blocks 23 will be outside and the rollers 26 and the brake-ring 28 inside, as will easily be imagined.

The device operates as follows: When the toothed rim 12 rotates forward, the guide ring 16 is checked somewhat by the friction in the disk 18 and the rollers 10 are thereby moved toward the shallower parts of the pockets 11 and are therefore pressed inward into the recesses 14 in the ring 13, whereby the sprocket rim 12 is coupled with the ring 13 screwed on the hub and causes the bicycle to be driven. If the pedals and, consequently, the toothed rim 12 are held stationary, the driving clutch is automatically disengaged, because the ring 13, rotating with the rear wheel, moves the rollers 10 to the deeper parts of the pockets 11, when they come out of the recesses 14. When the bicycle is pushed backward the driving-clutch mechanism is held out of action by the friction of the guide ring 16 in the disk 18, for which reason the brake can not be applied. When the toothed rim 12 is rotated backward by the rider, the guide ring 16 is firmly connected with the toothed rim by the rollers 10 abutting against the ends of the pockets 11 (Fig. 1) so that the ring will then be rotated backward. The brake blocks 23 guided between the lugs 24 are likewise rotated backward, and the clamping rollers 26, which are normally held at the deepest parts of the pockets 25, climb up the slanting faces and are moved radially outward, the consequence of which is that they expand the brake-ring 28, pressing the same against the flange 22 which rotates with the hub, whereas the brake-ring 28, owing to its connection with the disk 18, remains stationary and brakes the rear wheel. On account of the reaction of the rollers 26 on the blocks 23 the latter are pressed radially inward onto the periphery of the ring 20, for which reason a braking action occurs at this place also, while the guide ring is practically free from radial load.

Owing to the special formation of the mechanism, various advantages in operation are obtained. The driving and braking appliances are separated from one another by the brake arm, and are in operative relation with one another only by the guide ring of the clutch device. This combination provides a simple construction and a very narrow form of the mechanism which is consequently of small weight and loads the hub only slightly. The guide ring contains in recesses both the driving-clutch mechanism and the brake-operating mechanism and therefore not only controls both simultaneously, but also transmits the power from the driving mechanism to the brake subjected to axial or radial strain. The connection of the two appliances by means of the guide ring for the clutch rollers admits of the driving device and the brake being assembled as separate parts, secured by spring rings and then screwed as a whole on the hub in succession in the usual manner with right-handed and left-handed threads. The brake acts radially outward and inward, whereby the pressure on the brake disk is equalized without acting on the guide ring, while an extensive braking surface is simultaneously produced by the double action. The brake-actuating mechanism is arranged free to rotate inside the brake ring, which enables the ready operation of the various gears without there being disturbing friction.

We have shown a constructional embodiment of our invention for purpose of example, but obviously the various parts of the mechanism may be varied in shape and relative position, without departing from the principle of our invention, as explained in the foregoing specification. We, therefore, do not wish to be limited to the details illustrated, but—

What we broadly claim as our invention, and desire to secure by Letters Patent is:

1. In a free wheel and brake apparatus, the combination with a hub, and a sprocket around the hub, of a driving clutch between the hub and the sprocket, a stationary brake ring, a member rotating with the hub and disposed adjacent the brake ring, means for expanding the brake ring against said member, and a connection between said means and the driving clutch.

2. In a free wheel and brake apparatus, the combination with a hub, and a sprocket around the hub, of a driving clutch between the hub and the sprocket, a member rotating with the hub, braking mechanism having radial movement to bear upon said member, and an intermediate connection between the braking mechanism and the driving clutch.

3. In a free wheel and brake apparatus, the combination with a hub, and a sprocket around the hub, of a driving clutch between the hub and the sprocket, a stationary brake ring, a member rotating with the hub and disposed adjacent the brake ring, brake blocks arranged to bear upon said member, a connection between the brake blocks and the driving clutch, and means actuated by said connection to expand the brake ring and press the brake blocks against the rotating member.

4. In a free wheel and brake apparatus, the combination with a hub, and a sprocket thereon, of a driving clutch between the hub and the sprocket, a guide ring extending from the clutch, a member rotating with the hub, brake blocks mounted in said guide ring and arranged to bear upon said rotating member, and means for forcing the brake blocks against said member controlled by the guide ring.

5. In a free wheel and brake mechanism, the combination with a hub, and a sprocket around the hub, of a plurality of clutch rollers between the hub and the sprocket, a guide ring for said rollers, a stationary split brake ring, a plurality of brake blocks mounted loosely in the guide ring to rotate therewith, members rotatable with the hub and disposed adjacent the brake blocks and the brake ring, and devices interposed between the brake blocks and the brake ring to press the same against the rotatable members.

6. In a free wheel and brake mechanism, the combination with a hub, of ring members mounted on the hub by opposed threaded connections, a driving mechanism mounted on one of said rings, a braking mechanism mounted on the other of said rings, and a guide ring connecting and controlling the driving and braking mechanisms.

7. In a brake, the combination with a hub, of a stationary brake-ring, a series of brake-blocks rotatable with the hub, pressure devices interposed between the brake blocks and the brake ring, and a brake-applying member having spaced lugs loosely engaging the brake blocks.

8. In a brake mechanism, the combination with a hub, of a ring fixed thereon, a disk rigid with said ring and having an annular flange at its outer edge, said ring, disk and flange forming a casing, a stationary brake disk closing said casing, a brake ring secured to the brake disk and arranged within said casing, a series of brake blocks rotatable within the casing, pressure devices arranged between and bearing against the brake blocks and the brake ring, and a brake-applying member extending into the casing and loosely engaging the brake blocks.

In testimony whereof we have signed our names to this specification in the presence of two subscribing witnesses.

ERNST SACHS.
MAX MOSSIG.

Witnesses:
HENRY HASPER,
WOLDEMAR HAUPT.

Copies of this patent may be obtained for five cents each, by addressing the "Commissioner of Patents, Washington, D. C."